United States Patent
Boucher et al.

[11] Patent Number: 5,819,931
[45] Date of Patent: Oct. 13, 1998

[54] PACKAGE USEFUL IN STORING AND HANDLING FRAGILE DICING BLADE

[76] Inventors: John N. Boucher, 110 Coveridge La., Longwood, Fla. 32779; David E. Bajune, 6800 W. State Rd. 46, Sanford, Fla. 32773

[21] Appl. No.: 823,447

[22] Filed: Mar. 24, 1997

Related U.S. Application Data

[63] Continuation of Ser. No. 425,105, Apr. 20, 1995, Pat. No. 5,613,350, which is a continuation-in-part of Ser. No. 996,612, Dec. 24, 1992, abandoned.

[51] Int. Cl.$^6$ .............................. A45C 11/26; B65D 85/02
[52] U.S. Cl. .............................. 206/349; 40/594; 40/772; 206/303; 206/470
[58] Field of Search ........................... 40/772, 773, 594; 229/3.5; 383/86, 95; 206/725, 349, 303, 467, 470, 484, 489, 722, 701

[56] References Cited

U.S. PATENT DOCUMENTS

| | | |
|---|---|---|
| 2,578,869 | 12/1951 | Washburn . |
| 2,583,791 | 1/1952 | Neff . |
| 2,637,152 | 5/1953 | Kraus ................................. 206/489 X |
| 2,750,719 | 6/1956 | Wandelt . |
| 2,950,004 | 8/1960 | Acomb .................................... 206/349 |
| 3,090,171 | 5/1963 | Stimson . |
| 3,098,272 | 7/1963 | Frye . |
| 3,134,210 | 5/1964 | Dreyfus ............................... 206/461 X |
| 3,245,166 | 4/1966 | Hagner . |
| 3,339,728 | 9/1967 | Werner ............................... 206/461 X |
| 3,381,402 | 5/1968 | Ohfuji .................................. 40/773 X |
| 3,456,784 | 7/1969 | Sirago . |
| 3,462,329 | 8/1969 | Beyer . |
| 3,462,909 | 8/1969 | Anderson . |
| 3,490,972 | 1/1970 | Rogers . |
| 3,509,994 | 5/1970 | Poznak .................................... 206/772 |
| 3,581,423 | 6/1971 | Mascolo . |
| 3,626,921 | 12/1971 | Lane . |
| 3,645,002 | 2/1972 | Hefti . |
| 3,645,281 | 2/1972 | Seidler ............................... 206/722 X |
| 3,654,744 | 4/1972 | Smith . |
| 3,670,434 | 6/1972 | Shibata et al. . |
| 3,672,113 | 6/1972 | Andra . |
| 3,685,734 | 8/1972 | Paciorek et al. . |
| 3,738,903 | 6/1973 | Berwick et al. . |
| 3,763,698 | 10/1973 | Suzuki et al. . |
| 3,803,906 | 4/1974 | Ross . |
| 3,809,233 | 5/1974 | Gruszlea ................................. 206/722 |
| 3,908,824 | 9/1975 | Takahara et al. . |
| 3,924,879 | 12/1975 | Wright . |
| 3,965,621 | 6/1976 | Grieb et al. . |
| 3,987,670 | 10/1976 | Tuzzeo et al. . |
| 4,007,411 | 2/1977 | Saito . |
| 4,037,716 | 7/1977 | Marks . |
| 4,056,022 | 11/1977 | Ray . |
| 4,058,632 | 11/1977 | Evans et al. . |
| 4,104,833 | 8/1978 | Glowacki . |
| 4,180,048 | 12/1979 | Regan . |
| 4,219,004 | 8/1980 | Runyon . |
| 4,569,326 | 2/1986 | Tanizaki et al. . |

(List continued on next page.)

*Primary Examiner*—Bryon P. Gehman
*Attorney, Agent, or Firm*—Allen, Dyer, Doppelt, Milbrath & Gilchrist, P.A.

[57] ABSTRACT

A reusable package and method suitable for storage and handling of a fragile dicing blade includes a rigid card having a smooth surface upon which the blade is placed. A flexible plastic film is placed over the blade and card surface and bonds to the surface through a molecular bonding action with sufficient bonding force for holding the disk in place on the card. With such a combination of card, blade and film, the blade is protected during storing, shipping and handling. Further, such a packaging method provides for repeated use of this non-adhesive package thereby increasing useful life of both the blade and package. Molecular bonding of the film to the card surface provides sufficient strength to hold the blade and to provide a hermetically sealed chamber within which the blade is positioned and stored. A package and handling for a fragile dicing blade and electronic components is described but application for components having stringent handling and storage requirements is appropriate.

19 Claims, 3 Drawing Sheets

U.S. PATENT DOCUMENTS

| | | | |
|---|---|---|---|
| 4,741,519 | 5/1988 | Baryla | 40/594 |
| 4,742,631 | 5/1988 | Zimble . | |
| 4,787,362 | 11/1988 | Boucher et al. . | |
| 4,819,412 | 4/1989 | Sengewald . | |
| 4,854,450 | 8/1989 | Fisher . | |
| 4,971,021 | 11/1990 | Kubotera et al. . | |
| 4,986,421 | 1/1991 | Lipsitz . | |
| 4,992,121 | 2/1991 | Rubino . | |
| 5,031,360 | 7/1991 | Farnworth et al. . | |
| 5,390,446 | 2/1995 | Kazui et al. . | |
| 5,433,649 | 7/1995 | Nishida . | |
| 5,573,442 | 11/1996 | Morita et al. . | |

PACKAGE USEFUL IN STORING AND HANDLING FRAGILE DICING BLADE

CROSS-REFERENCE TO RELATED APPLICATIONS

This application is a continuation of application Ser. No. 08/425,105, filed Apr. 20, 1995, for "Method for Packaging and Handling Fragile Dicing Blade", now U.S. Pat. No. 5,613,350, which itself is a continuation-in-part of application Ser. No. 07/996,612, filed Dec. 24, 1992, for "Reusable Package and Method", which is now abandoned.

BACKGROUND OF THE INVENTION

1. Field of the Invention

The invention relates to the packaging and handling of sensitive components of the electronics industry and in particular to fragile dicing blades. Diamond, cubic boron nitride, amber boron nitride and silicon carbide blades are used for the cutting of hard brittle materials such as those used in the manufacture of microelectronic circuits and optical lenses that require small cutting blade widths. The invention addresses the handling, packaging, and storing of these fragile dicing blades and sensitive electronic components.

2. Background Art

The manufacturing of diamond dicing blades used by the electronics industry is done by a handful of producers. To date, there are no established standards regarding size, tolerance or labeling, and by no means is there an established form of packaging for these fragile dicing blades.

The dicing blade is a relative of the abrasive grinding wheel used by most machine shops and industrial manufacturers and the basis by which these tools work is similar. A major difference between these wheels or blades is the physical size. While there are many abrasive wheel manufacturers, they do not have the ability to manufacture such a fragile and delicate blade which is a reason for so few dicing blade manufacturers.

It is this handful of manufacturers that determines the packaging design for the dicing blade based on feedback from their customers and the experience gained through the trials, errors and testing of various packaging, handling and storing techniques. The result is that there are a variety of packaging designs presently used. Each manufacturer uses a different design than their counterpart. Each manufacturer has its advantages and disadvantages in present packaging design but certainly, no standard or consistency has been established as of this writing.

As discussed, precision abrasive dicing blades are basically abrasive wheels used for grinding, slotting, and cut-off operations very common in the machine shop environment but for major exceptions such as brittleness and size. Dicing blades range in blade thickness from as little as two ten thousandths of an inch (0.0002") to as high as one quarter of an inch(0.2500"). Diameters range, typically, from two to five inches. The finer thicknesses of 0.0008" to 0.0250" are extremely fragile and demand great care in packaging and handling in order to prevent breakage of the dicing blade. They are often broken during the handling of the blade prior to and following their use on the dicing saw or cutting machine. Improper handling during shipping, installation, and reuse results in broken, and thus unusable dicing blades.

Dicing blades are presently packaged and shipped in a variety of ways including rigid plastic or glass containers of various forms. In one example, of the rigid plastic container, a dicing blade or several dicing blades are sandwiched between layers of foam, placed within the container and sealed with a plastic cover which is taped to prevent accidental opening during handling and shipping. Identifying labels are generally affixed to the plastic cover, or lid. In this type of packaging, care must be taken to avoid pressing down on the top layer of foam during removal. Pressing down on the top foam can cause breakage of the dicing blade.

In certain dicing blade package designs, the blade is placed onto a bottom rigid plastic or cardboard base having a raised center hub similar to a phonograph record resting on a turntable. The base is then placed into a box or container for further protection of the dicing blade. This bottom center hub is often a part of the package made of rigid plastic material which is then affixed with a mating top cover. These packages take many stages and are generally awkward to handle. Other packages have bottom sections that have depressions to fit both the inner and outer diameter of the dicing blade to prevent shifting during handling and transit. In certain similar embodiments, the hub or depression is made a part of the container.

Consequently, packaging these fragile dicing blades has been difficult and users continue to demand support from the blade manufacturers for improvements. Many packages utilize a flexible foam material to create an intimate contact with the dicing blade to prevent shifting within the container. Other packaging such as those made by vacuum formed plastics with top and bottom mating sections have raised hubs which rest on the topmost dicing blade and adjust to the height of the dicing blade or stacked blades. Many dicing blades are placed between two plates of glass or plastic held together with tape. Extreme care must be taken so that the dicing blade does not slide toward the tapes and adhere to the tape resulting in blade breakage upon opening this type of packaging.

U.S. Pat. No. 4,819,412 issued to Sengewald discloses a process for the manufacture of packages made of prefabricated containers which are substantially dimensionally stable and have at a filling end and an outwardly projecting flange edge on which a cover sheet is fixed by welding, hot sealing or bonding. A thermoplastic sheet is applied to the containers to register a cover with the cover being separated along weakening lines to form closed containers. The object of the invention was to facilitate packaging cups of thermoplastic sheet material closed by a cover sheet. Problems have occurred with similar packages when used with the fragile blades during the abrupt movements needed for dislodging the cover from the container.

U.S. Pat. No. 4,037,716 issued to Marks discloses a card holder for keys or similar items comprised of a thin card having a depressed region therein for receiving and containing the items and a pressure resealable, a partially adhesively-coated lid covers the depressed region and is stripped or peeled back to expose the contained items. The presence of the adhesive creates further problems for the fragile disk for even slight contact with the adhesive will cause the blade to fracture and become unusable.

U.S. Pat. No. 3,738,903 issued to Berwick et al. discloses an apertured article of manufacture sealed in a plastic film envelope both along the periphery and the edge of an aperture of the article. Opposite faces of the envelope, normally unconnected in the area of the aperture, are brought together and heat sealed. The method of hermetically sealing opposite faces of a plastic film envelope along the edge of an aperture includes clamping and heat sealing the edges. Focus in on protectively enclosing articles of manufacturer usually of a generally flat configuration in such a fashion as to leave the apertures open while at the same time sealing not only about the outer periphery of the article but also along the edge of the aperture itself. The very permanent nature of the sealing process dictates that once the package is opened, it can no longer be used as originally intended. It is important in the handling and storing of fragile blades that a package provide protection of the blade but also that it be usable to meet blade use demands.

U.S. Pat. No. 3,456,784 issued to Sirago discloses a rigid, fluid tight, hand fracturable container for protecting o-rings and other small rubber or synthetic plastic parts from deterioration and deformation. The patent discloses a container in which a chamber is defined between two panels which are sealed to one another in a fluid tight relationship. The container of the invention is adapted to protect a variety of sizes of circular precision seals from abrasion, deformation and deterioration through contact with the ambient atmosphere. Access to the stored material is achieved by fracturing the container thus permitting exposure and access. Again, reuse is not possible as is the case in many of the packages in the prior art.

U.S. Pat. No. 4,741,119 issued to Baryla discloses a display board for displaying a sheet document behind a transparent window which relies on attraction caused by static electricity to hold the sheet document between a backing board and the transparent window. Baryla '119 discloses the use of a backing board made of dielectric material which may be any synthetic resin having a high dielectric constant. As described, preferably the board is a relatively thick and rigid plate of acrylic resin having a smooth face for covering with a sheet of transparent plastic film. Baryla '119 further discloses that it is sufficient to rub the surface of the sheet document to charge it electrostatically such that it clings to the face of the backing board, and the cover sheet of transparent plastic is caused to cling electrostatically to the surface of the paper document, and cling in most instances, to marginal surface portions of the backing board. Although such a device and method is useful for displaying a sheet document, such in not the case for a fragile dicing blade. Fragile dicing blades are typically conductive. Static clinging of the conductive blade is therefore not possible as might be suggestive in the display device of Baryla '119. Further, the clinging forces developed by the static charges are typically orders of magnitude below what is required to hold items such as a fragile dicing blade in place. A clinging force unavailable through static cling is needed for a package needed in the industry. The teachings in the display of paper sheet documents using static cling techniques is not where one would look to solve the problems associated with the handling, packaging, and storing of fragile dicing blades.

Further, the teachings in the display arts in general do not solve the specific problems associated with handling the fragile blades. By way of example, U.S. Pat. No. 3,670,434 to Shibata et al. discloses an adhesive sheet device for mounting photographs and other display items in albums which includes providing a relatively thick backing sheet and thin film of pressure-sensitive adhesive coating on one surface of the sheet. A cover sheet is disengageably adhered to the coated surface of the backing sheet for insertion of an item beneath the cover sheet for clear viewing. As described earlier, the adhesive material would be harmful to the blade and cause breakage during use.

SUMMARY OF INVENTION

Faced with the needs in the industry as earlier herein described, the present invention provides a reusable package for the storing, shipping, and handling of disks such as the fragile dicing blades used in the electronics industry. It is typical in the industry for a blade to be damaged when received by the user. Such damage occurs during the shipment because of the brittle nature of the abrasive dicing blade. The user often damages the blade beyond use in a first step of removing the blade from its package. Typical packages may protect the blade for shipment but will not protect the blade during removal from that package and handling through continued use and reuse of the blade. In addition, because the blades typically do not have their specifications affixed to the blade itself but to their packaging, it becomes important to provide a package that can be repeatedly used without damage to the package and without deformation and thus damage to the fragile blade.

It is therefore an object of this invention to provide a package that will protect the fragile blades and sensitive components during shipping. It is also an object to provide a package that can be reused a multiplicity of times without damage to the package or to the blade. It is yet another object to provide a method for handling fragile dicing blades and the sensitive components in such a way that their identification is maintained throughout their use and provide access to a new blade or used blades that is safe and decisive for the user. An embodiment of the invention disclosed specifically addresses the storage and handling of fragile abrasive blades used in cutting silicon and other hard electronic materials. However, an extension to the handling of other products is anticipated for ease in handling and multiple use without damage to the product or to the package. It is yet another object of the invention to provide a reusable package for components sensitive to static charges, wherein such static charges typically damage or destroy the component. Further, it is an object to provide such a package that hermetically seals the component for storage and handling within and outside clean room conditions.

The dicing blade, as stated earlier, is fragile; and within the range of dicing blades, there are some more fragile than others, specifically the dicing blades with a thickness range of 0.0008 to 0.0020 inches. These blades have a frequent breakage problem. Considering the average cost of these blades at this writing is about $25.00 each, it is a major concern to the end user to safely get these blades to production and store them safely when not in use. It is therefore a further object of the invention to provide a reusable non-adhesive package with sufficient strength for holding a fragile blade therein and further to provide an airtight seal for such storage.

With such needs identified, manufacturers are constantly attempting new package designs to address these issues, and until the present invention, no package has been able to satisfactorily solve these problems.

With such in mind, a method for storing and handling a fragile dicing blade comprises the steps of providing a substantially flat card having a flat smooth surface sufficiently smooth for permitting a fragile blade to be slidably moved across the surface, the surface sized to receive the fragile dicing blade, placing the fragile dicing blade onto the smooth surface, and placing a flexible plasticized film onto the smooth surface thus covering the blade, the film having a first outer surface and a second contact surface, the film second contact surface bonding to the card surface through a molecular bonding sufficient for holding the fragile blade between the contact surface and the card surface. The bonding force between the film and card is such to provide a hermetic seal around the blade when the film is pressed against the card surface at portions of the card surrounding the blade, thereby forming an airtight chamber.

In an alternate embodiment, pockets within the card and the film in combination form the airtight chamber, wherein sensitive workpieces are stored.

By affixing a tab to the card, indicia is added to the tab that provides, by way of example, the disk specifications. With a transparent film, indicia containing generic information about the disk and information about the recommended handling of the disk, especially in the case of fragile dicing blades placed on the card is in clear view along with information contained on the blade itself.

By providing a notch along an edge portion of the card and extending the film over the notch, the film is easily accessible and pulled back from its clinging position when access to the disk is desired. In addition, by affixing an edge of the film to an edge of the card, the film can be peeled back to expose the disk and remain with the card.

The method permits the storage, removal and reuse of the package and blade a multiplicity of times without damage to the package or the blade.

BRIEF DESCRIPTION OF DRAWINGS

A preferred and alternate embodiments of the present invention is described by way of example with reference to the accompanying drawings in which.

DETAILED DESCRIPTION OF PREFERRED EMBODIMENT

Figure 1:
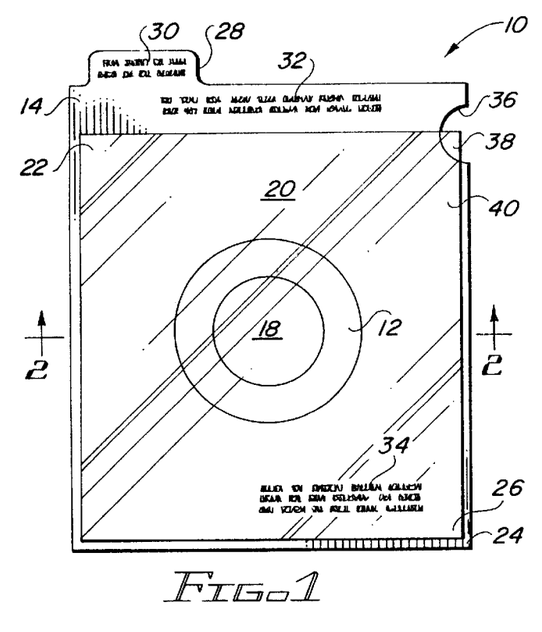
FIG. 1 is a front plan view of a preferred embodiment of the present invention.
Figure 2:
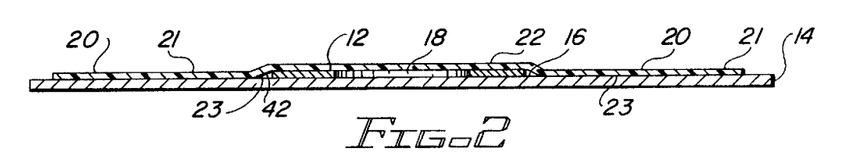
FIG. 2 is a partial cross-sectional view of the embodiment of FIG. 1 through a central portion thereof.
Figure 3:
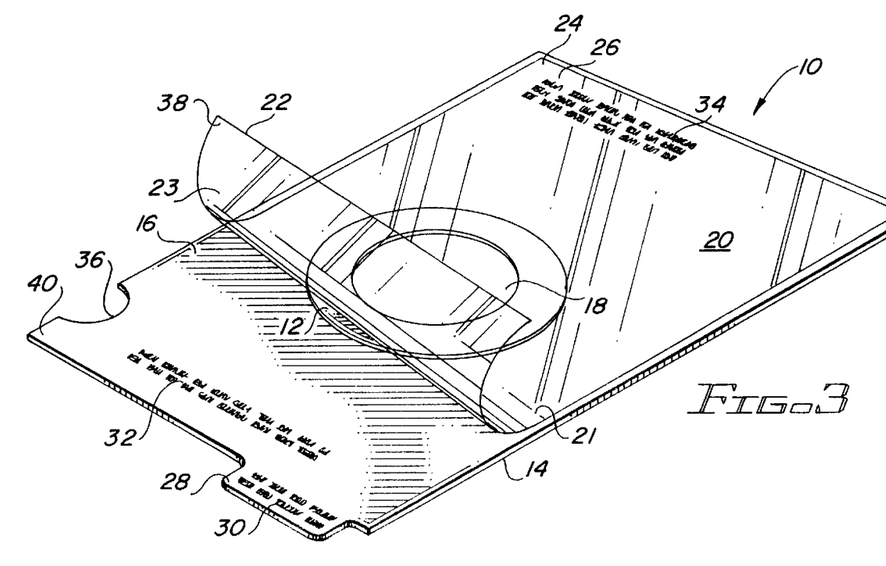
FIG. 3 is a perspective view of the embodiment of FIG. 1 illustrating flexible film peeled away from a card surface.

A preferred embodiment of the present invention, a reusable package 10 suitable for storing a fragile dicing blade or disk 12 is illustrated with reference to FIGS. 1 through 3. In the present invention, the package 10 comprises a card 14 having a smooth surface 16. In the preferred embodiment of the present invention, the card 14 is generally rectangular in shape and comprises a central portion 18 within a card marginal portion 20 around the central portion 18 and generally about the periphery of the card 14. The central portion 18 is dimensioned to receive the blade 12. It is anticipated that various size cards 14 will be used to hold the various sized blades 12 currently in use within the industry as specifically addressed herein for dicing blades or other disk styled pieces requiring special handling and care.

In the embodiment illustrated with reference to FIGS. 1, 2 and 3, a transparent flexible film 22 is used. The film 22 is sized to fit the card 14 for covering the card marginal and central portions 18, 20. With a blade 12 placed within the card central portion 18, the film 22 covers the marginal portion 20 sufficiently for providing a molecular bonding force to bond the film 22 to the smooth surface 16 and thus hold the blade 12 in place within the card central portion 18. With reference to FIG. 2, the blade 12 is couched within the central portion 18 as the film 22 covers the marginal portions 20 of the card smooth surface 16. A film edge 24 is affixed to a cooperating card edge 26 to maintain communication between the card and film. Thus, the film 22 remains with the card 14 when not in use, and provides a convenient mechanism when handling and storing the disk 12.

In one embodiment, a tab 28 is integrally formed with the card 12. By way of example, the tab 28 is used for indicia 30 to provide information about the disk 12 being stored in that specific package 10. Other indicia locations throughout the card surface 16 are used to provide information about the handling 32 and product manufacturer 34, herein presented by way of example. Further, the use of a transparent film 22, although not necessary for storage, permits indicia to be imprinted directly onto the card smooth surface 16 and be clearly visible to users. A plurality of indicia combinations and indicia locations are anticipated to suit the needs of the specific user or blade 12.

Before placing the blade 12 onto the card 14, the film 22 is peeled back as illustrated with reference to FIG. 3. By locating a notch 36 at a marginal portion site 40, the film 22 is easily accessed or secured and peeled back so as to expose the card central portion 18 for access to the blade during blade removal or replacement steps. By keeping the smooth surface 16 an the film contact surface 23 clean, the placement and removal of the disk 12 can be executed a multiplicity of times without damage to the blade 12 or the package 10.

Further, by maintaining a clean smooth surface 16, the blade 12 can be slid from the central portion 18 to past the marginal portion 20 and off the card smooth surface 16 onto an appropriate work surface (not shown) employed by the user. In addition, maintaining a clean smooth surface 16 and clean film contact surface 23 provides an optimum peel strength or bonding force between the surfaces 16, 23. Although not required, pressing on the film 22 along a film top surface 21 at a film portion communicating with the card marginal portion 20, additional bonding force is achieved for sufficiently holding the blade 12 in place within the central portion 18 where is had been placed during handling. The pressing assures that a bonding force between the card surface 16 at the card marginal portion 20, wherein the surface 16 in contact with the film contact surface 23, provides a hermetic seal around the blade 12 for alternate embodiments where airtight sealing of the blade 12 or other components is needed.

Again with reference to FIG. 2, the film contact surface 23 forms a hermetic seal with the card surface 16 and when passing around the central portion 18 forms an air tight chamber 42 for the blade 12 or other workpiece being stored within the package 10. Providing an air tight chamber 42 as described permits a blade 12 to be packaged within a "clean room" environment, transported through a "contaminated air" environment to another clean room environment where it is unpacked. Such a procedure will be more appreciated for workpieces such as electronic components whose handling requires the strictest of clean room conditions. An alternate embodiment of the package 100 focuses on the packaging of an electronic component by way of example with reference to FIGS. 4–7.

Figures 4, 6:
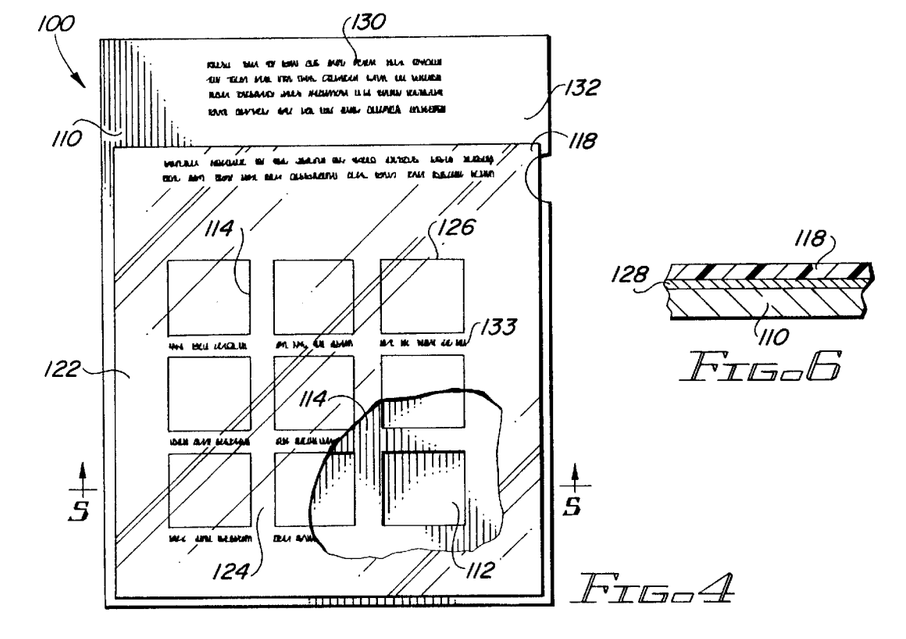
FIG. 4 is a front plan view of an alternate embodiment of the present invention.
FIG. 6 is a partial cross-sectional view passing through section VI—VI as illustrated in FIG. 5.

The package 100, as illustrated with reference to FIG. 4, comprises a card 110 having a plurality of pockets 112 positioned within a card central portion 114. The pockets 112 are dimensioned for receiving a workpiece 116, an electrical component such as a die as will be herein, by way of example, described with reference to FIG. 7. It is anticipated that various numbers and sizes of pockets will be formed within the card central portion to accommodate the various components suited to such packaging. The example illustrated with reference to the embodiment addressed is prepared for a die having a dimension of approximately 10 mm square by 0.5 mm thick.

Figure 5:
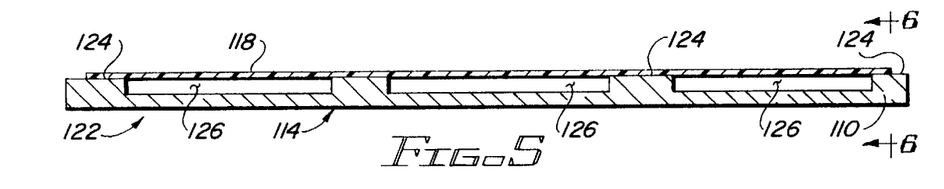
FIG. 5 is a partial cross-sectional view passing through section V—V as illustrated in FIG. 4.
Figure 7:
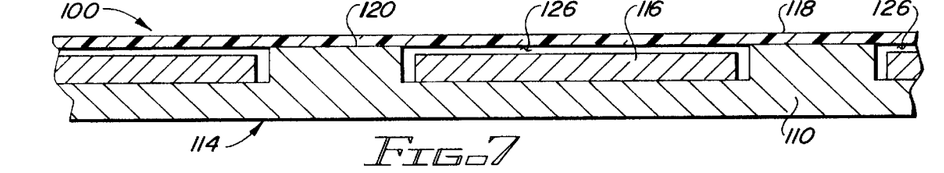
FIG. 7 is a partial cross-sectional view as illustrated in V—V of FIG. 4 further illustrating work pieces within air tight chambers formed by card pockets and flexible film in a hermetic seal combination.

With reference to FIG. 5, the flexible film 118 removably bonds with the card surface 120, through a molecular bonding along card marginal portion 122 forming a hermetic seal, as was earlier discussed with reference to the package 10 of FIGS. 1–3. In addition, a seal is formed at surface contact locations 124 around each pocket 112. Air is therefore trapped within each chamber 126 formed by the combination of pocket 112 and film 118. As earlier described, it is now possible to package a component 116 within a clean room environment and transport the package 100 with the component 116 through a dirty environment to another clean room for unpacking while maintaining the component 116 within a specified clean room condition. Further, like the embodiment 10 earlier described, the alternate package 100 is reusable, does not require adhesives that can damage the package 100 and the component 116, and provides easy access to the workpiece/component 116.

Further by way of example, in semiconductor manufacturing, typical problems resulting from static electricity are attraction of contamination, and degradation or destruction of components due to electrostatic discharge. Static-caused contamination problems are seen at practically every stage of the manufacturing process from the artwork preparation and masking stages to final packaging. Not only do the tools used, work surfaces, and surrounding materials become charged, but the contaminated particles themselves also become charged and attract other contaminants. By providing the package 10, 100, as described, employing an antistatic vinyl film, damaging static charge is eliminated.

As illustrated with reference to FIG. 6, one embodiment of the present invention comprises a thin film of vinyl 128 coated onto the card surface 120 for contacting the film 118 which in one embodiment comprises a vinyl material similar to that of the film 128. However, a variety of surfaces are appropriate and typically include non-porous smooth surfaces to allow for molecular bonding and a hermetic seal between the card surface and film contact surface. Again with reference to FIG. 5, chambers 126 are formed by the combination of card pocket 112 and film 118 and with such a chamber 126, workpieces 116 are stored therein as illustrated with reference to FIG. 7. As earlier described with reference to FIGS. 1–3, by using a transparent film material, the workpiece 116, and indicia 130 placed on the card surface at appropriate locations 132, 133, by way of example, permit convenience in the handling of the package 100 and workpiece 116. Various tests and measurements were made during the development of the present invention. Initially, studies were completed for the purpose of determining the range of holding power, peel strength, or bonding force of the plastic film 22 used in the present embodiment. Three different thickness plastic thin films, which bond to a smooth surface 16, through molecular bonding were tested to determine their holding power. The specimens were 12 mils, 7 mils and 4 mils thick. Measurements of peel strength were made after one, ten and twenty three peels. Apparatus was used as described in ASTM D-4649 Section A3.3 along with an INSTRON Model No. 1122 for testing samples. The range of holding power for the films was determined. It was concluded that a film thickness of a few mills was sufficient to support a blade 12 such as the fragile dicing blades herein described. For the typical number of times that a blade is removed and replaced in its package, a wide range of film thicknesses is anticipated. As the film thickness increases, increased protection of the blade 12 is realized but it becomes more difficult to ensure that the film 22 sufficiently clings to the card marginal portions 20. The preferred embodiment of the present invention uses a film thickness of less than ten mils for use with blades ranging in thickness from a tenth of a mill to approximately six mils. It is anticipated that various thickness films will be used as well as a variety of thickness disks.

Within the background section of this specification, it was stated that reliance on static cling between a film and board or card surface as is used for displaying photographs and paper products was not appropriate for storing fragile dicing blades. In fact, even if the typical dicing blade was not electrically conductive, the present invention requires bonding forces that are orders of magnitude greater than can be achieved using static charges and therefore the disclosure addressed in the background section could not satisfy the needs presented herein. Further, achieving a hermetic seal would be difficult if not impossible given the nature of the static clinging process.

It is not the intent nor within the scope of this specification to fully describe physical phenomenon but to point out distinguishing characteristics and quantify to some extent terms used within the specification and claims which distinguish over prior art.

To address holding forces more precisely, first consider the fact that adhesion has different definitions in different disciplines according to the McGraw-Hill, Inc. Dictionary of Scientific and Technical Terms, 5th Edition. As herein addressed, there is a distinction between mechanical adhesion such as a clinging force from static friction and a physical adhesion resulting from intermolecular forces causing molecular bonding. The forces between the film contact surface 23 and the card smooth surface 16 from such molecular bonding are sufficient to hold the blade 12 between the film 22 and the card surface 16. Static cling forces are not.

To quantify such a distinction, tests were run to distinguish between such forces and to support the claimed invention which calls for, by way of example, clinging with sufficient force for holding the blade 12 between the film 12 and the card surface 16.

Figure 8:
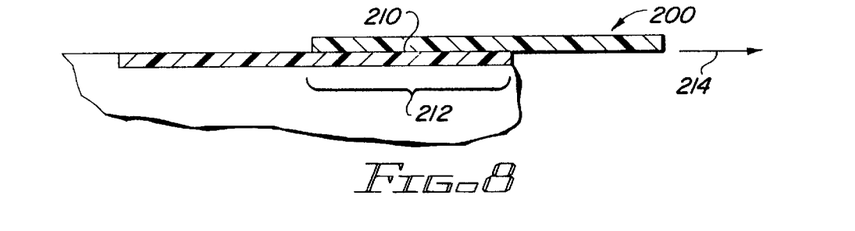
FIG. 8 is a partial side view of a film and card surface functionally illustrating a contact surface for use in tests and measurements of peel strength bonding, or clinging forces.

With reference to FIG. 8, load measurements were made for a vinyl plastic film used in the preferred embodiment of the invention and a sample cut from a calendar packaging material presumed to be a polyvinyl acetate having static cling characteristics suggested in the prior art. The calendar was supplied by Keith Clark Co. of Sidney, N.Y. and the vinyl was representative of that typically supplied by Molco, Inc. of Waymart, Pa. The tests and measurements were provided by E. Dow Whitney, Ph.D. from the University of Florida, Department of Materials Science and Engineering, Gainesville, Fla.

The results from the tests and measurements are summarized in Table 1. The x-series values in the left column represent the vinyl material used in the present invention, while the y-series values are for the static clinging material typically found in display products referred to in the prior art and represented by the calendar sample addressed above. Five samples were tested from each of these groups, with each sample being tested three times. Samples 1a, 1b, and 1c, for example, represent three consecutive trials of the same sample. The specimens 200 were prepared identically in form of rectangular lap joints 210, 0.5 inches wide and 3.5 inches in length, with a 2.5 inch overlap 212 to define a bonded area as illustrated with reference to FIG. 8. The tests were performed on an Instron 1120 Tensiometer using a 3.0 gauge length and a constant 1.0 inch per meter stroke rate to measure a "clinging force" 214 for pulling the samples apart. Test conditions were identical for both materials, except that a smaller load cell was substituted for the measurement of the load values (for accuracy) for the y-series (static cling) samples.

TABLE 1

TEST AND MEASUREMENT RESULTS

| Sample | Load (pounds) | |
|---|---|---|
| | x-series | y-series |
| 1a | 2.33 | 0.001519 |
| 1b | 2.28 | 0.001732 |
| 1c | 2.66 | 0.003840 |
| 2a | 2.57 | 0.001171 |
| 2b | 2.60 | 0.001645 |
| 2c | 2.64 | 0.002274 |
| 3a | 2.83 | 0.003298 |
| 3b | 2.67 | 0.004646 |
| 3c | 2.59 | 0.006149 |
| 4a | 2.67 | 0.006214 |
| 4b | 2.76 | 0.009458 |
| 4c | 2.43 | 0.004148 |
| 5a | 2.79 | 0.002882 |
| 5b | 2.60 | 0.006675 |
| 5c | 2.65 | 0.004132 |

The first one should observe when comparing the values of Table 1 is that there is a three orders of magnitude difference between the loads supported by the x-series and y-series samples. The strength of the x-series lap joints is far greater than what would be expected due to static cling. The x-series lap joint provides "sufficient force for holding a blade between the film and the card surface" of the present invention. In fact, the material in the lap joint of the y-series, static cling sample, is incapable of sustaining a level of static charge that would be required to explain the high loads and, sufficient bonding forces, needed in the present invention.

Figure 9:
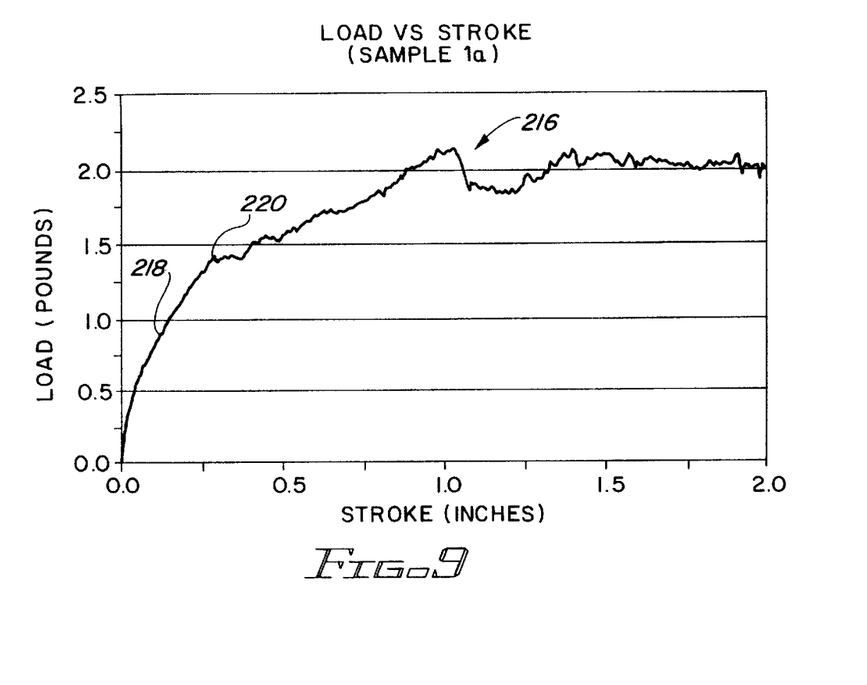
FIG. 9 is a graph illustrating a load-elongation relationship for a film material of the present invention.
Figure 10:
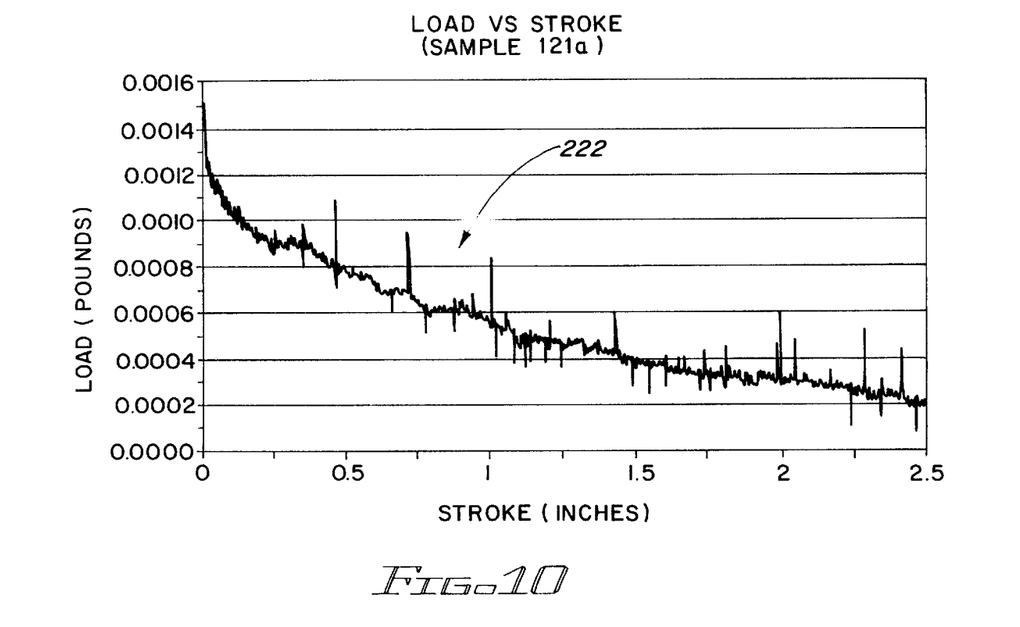
FIG. 10 is a graph illustrating a load-elongation relationship for a static cling sample material.

Further, FIGS. 9 and 10, are included by way of example to depict load and elongation behavior for a representative sample of each material. FIG. 9 is a representative load-elongation curve 216 for one of the x-series samples used in the packages 10, 100 of the present invention. The first part of the curve 218 is roughly linear, and corresponds to elastic deformation of the plastic half of the lap joint. The point 220 in the curve where the first jagged edges appear corresponds to the onset of slip. From this point 220 on, the material alternates between elastic deformation of the plastic and yielding (a reduction in overlap area) in the joint area. FIG. 10 is a representative load-elongation curve 222 for one of the y-series, static cling, lap joints. In contrast to the x-series samples, the applied stress in this case is distributed over the entire overlap length 212. As a result, as soon as the joint is stress, slippage begins to occur, resulting in a reduction of overlap area 212 because the stress is uniformly distributed and the joint is subjected to a constant strain rate, the supported load undergoes a roughly linear decrease until failure as further illustrated with reference to the graph of FIG. 10. In other words, the holding mechanism as well as the magnitude of bonding forces is substantially different, a teaching away from the prior art static clinging methods earlier described with reference to displaying photographs.

While a specific embodiment of the invention has been described in detail herein above, it is to be understood that various modifications may be made from the specific details described herein above without departing from the spirit and scope of the invention as set forth in the appended claims.

Having now described the invention, the construction, the operation and use of preferred embodiments thereof, and the advantageous new and useful results obtained thereby, the new and useful constructions, methods of use, and reasonable mechanical equivalents thereof obvious to those skilled in the art, are set forth in the appended claims.

What is claimed is:

1. A package useful in handling and storing a fragile dicing blade, the package comprising:

a card having a surface for engaging a fragile dicing blade, the surface extending across a card central portion for storing the fragile dicing blade therein and a card marginal portion around the card central portion, the surface of the card sufficient for removably bonding with a plastic film and for slidably engaging the fragile dicing blade;

a fragile dicing blade carried on the surface of the card within the card central portion when in a stored position; and a flexible plastic film extending over the fragile dicing blade and across the card surface engaging the card marginal portion when the fragile dicing blade is in the stored position, the flexible plastic film removably attached to the card by a molecular bonding between the plastic film and the card marginal portion, the molecular bonding between the surface of the card marginal portion and the flexible plastic film providing a bonding force sufficient for holding the fragile dicing blade therebetween and within the card central portion.

2. The package according to claim 1, wherein the flexible plastic film comprises a transparent portion for viewing the fragile dicing blade carried within the card central portion.

3. The package according to claim 1, wherein the flexible plastic film is hingedly attached to a card peripheral edge portion.

4. The package according to claim 1, wherein the card marginal portion comprises a notch, and wherein a portion of the flexible film extends over the notch during the stored position, the portion of the flexible film extending over the notch useful for handling the flexible film when peeling back the flexible film for exposing the fragile dicing blade.

5. The package according to claim 1, wherein the card further comprises a tab outwardly extending from a card periphery.

6. The package according to claim 1, wherein the card has a thickness dimension for providing a rigidity to the card for supporting the fragile dicing blade in a flat position.

7. The package according to claim 1, wherein the fragile dicing blade comprises an electrically conductive fragile dicing blade.

8. A package useful in handling and storing a fragile dicing blade, the package comprising:

a card having a surface for engaging a fragile dicing blade, the surface extending across a card central portion for storing the fragile dicing blade therein and a card marginal portion around the card central portion, the surface of the card sufficient for removably bonding with a plastic film and for slidably engaging the fragile dicing blade; and a flexible plastic film removably attached to the surface of the card, the flexible plastic film having a dimension for extending across the card surface for engaging the card marginal portion when the fragile dicing blade is in a stored position within the card central portion, the flexible plastic film being removably attached to the card by a molecular bonding between the plastic film and the card surface, the molecular bonding between the surface of the card marginal portion and the flexible plastic film providing a bonding force sufficient for holding the fragile dicing blade therebetween and within the card central portion.

9. The package according to claim 8, wherein the flexible plastic film comprises a transparent plastic film for viewing the fragile dicing blade when in the stored position.

10. The package according to claim 8, wherein the flexible plastic film is hingedly attached to a card peripheral edge portion.

11. The package according to claim 8, wherein the card marginal portion comprises a notch, and wherein a portion of the flexible film extends over the notch during the stored position.

12. The package according to claim 8, wherein the card further comprises a tab outwardly extending from a card periphery.

13. The package according to claim 8, wherein the card has a thickness dimension for providing a rigidity to the card for supporting the fragile dicing blade in a flat position.

14. A package useful in storing and handling electronic components, the package comprising:

a card having a surface sufficient for removably bonding with a plastic film placed thereon, the card having a pocket within a card central portion for receiving and storing a component therein, the card further having a card marginal portion around the card central portion; and a flexible plastic film extending over the card surface engaging the card marginal portion, the flexible plastic film removably attached to the card through a molecular bonding between the plastic film and the card marginal portion, the molecular bonding between the surface of the card marginal portion and the flexible plastic film providing a hermetic seal of the flexible film around the pocket.

15. The package according to claim 14, further comprising the card central portion having a plurality of pockets therein.

16. The package according to claim 15, wherein the plurality of pockets are arranged within a matrix of rows and columns.

17. The package according to claim 14, wherein the flexible plastic film comprises a transparent portion for viewing the component within the pocket.

18. The package according to claim 14, wherein the flexible plastic film is hingedly attached to a card peripheral edge portion.

19. The package according to claim 14, wherein the card marginal portion comprises a notch, and wherein a portion of the flexible film extends over the notch during the stored position, the portion of the flexible film extending over the notch useful for handling the flexible film when peeling back the flexible film for accessing the pocket.

* * * * *